US00RE38458E

(19) United States
(12) Reissued Patent
Pallini, Jr. et al.

(10) Patent Number: US RE38,458 E
(45) Date of Reissued Patent: Mar. 9, 2004

(54) VERTICAL STAB TENDON BOTTOM CONNECTOR AND METHOD FOR SECURING AND RELEASING THE SAME

(75) Inventors: Joseph W. Pallini, Jr., Tomball, TX (US); Jerry K. Rhodes, Conroe, TX (US); Jason R. Jackson, Houston, TX (US)

(73) Assignee: ABB Vetco Gray Inc., Houston, TX (US)

(21) Appl. No.: 09/962,991

(22) Filed: Sep. 25, 2001

Related U.S. Patent Documents

Reissue of:
(64) Patent No.: 5,984,585
Issued: Nov. 16, 1999
Appl. No.: 08/937,830
Filed: Sep. 26, 1997

U.S. Applications:
(60) Provisional application No. 60/027,490, filed on Sep. 27, 1996.

(51) Int. Cl.[7] ..... E02D 5/54; F16L 35/00
(52) U.S. Cl. ..... 405/223.1; 405/195.1; 405/224; 403/322.4; 285/307; 166/365; 166/382
(58) Field of Search ..... 403/322.1, 322.4, 403/322.3; 405/195.1, 223.1, 224, 224.1, 224.2, 224.3, 224.4; 285/307, 123.9, 123.13; 166/350, 359, 367, 365, 382, 340, 339, 348

(56) References Cited

U.S. PATENT DOCUMENTS

| | | | | | |
|---|---|---|---|---|---|
| 4,451,056 | A | * | 5/1984 | Galle, Jr. | 285/307 X |
| 4,459,931 | A | * | 7/1984 | Glidden | 405/224 X |
| 4,610,468 | A | * | 9/1986 | Wood | 285/307 X |
| 4,611,953 | A | * | 9/1986 | Owens | 405/224 |
| 4,869,615 | A | * | 9/1989 | Galle | 405/224 X |
| 5,048,874 | A | * | 9/1991 | Ohlsson | 285/307 X |
| 6,536,527 | B2 | * | 3/2003 | Munk et al. | 166/348 X |

* cited by examiner

*Primary Examiner*—Heather Shackelford
*Assistant Examiner*—Sunil Singh
(74) *Attorney, Agent, or Firm*—Bracewell & Patterson, L.L.P.

(57) ABSTRACT

A bottom connector for the tendon of a tension leg platform uses a latch ring with an outer profile to engage a mating profile in a receptacle on the sea floor. The latch ring moves radially within a housing, relative to the receptacle, between an engaged position and a retracted position. The latch ring engages the receptacle by lowering the connector into the receptacle below the mating profile and then lifting it until the latch ring locks into the receptacle. The latch ring disengages the receptacle by lowering the connector beyond a recess located below the mating profile and then lifting the connector out of the receptacle. As the connector is lifted above the recess, a retaining ring is actuated by the recess to retain the latch ring in its retracted position.

52 Claims, 6 Drawing Sheets

Fig. 11
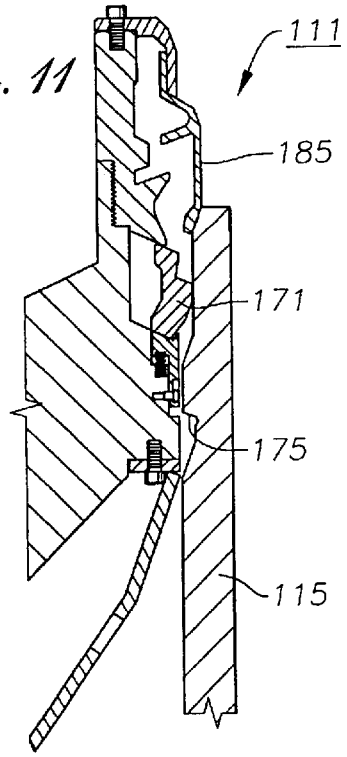
Fig. 12
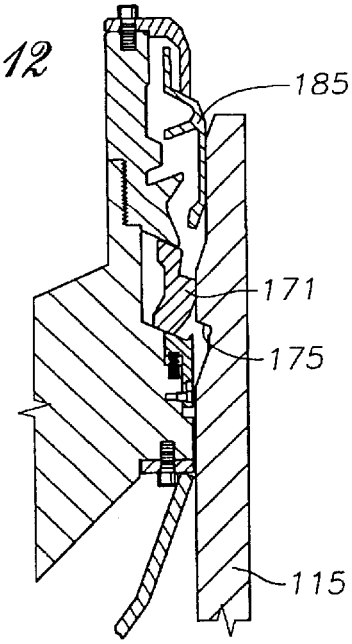
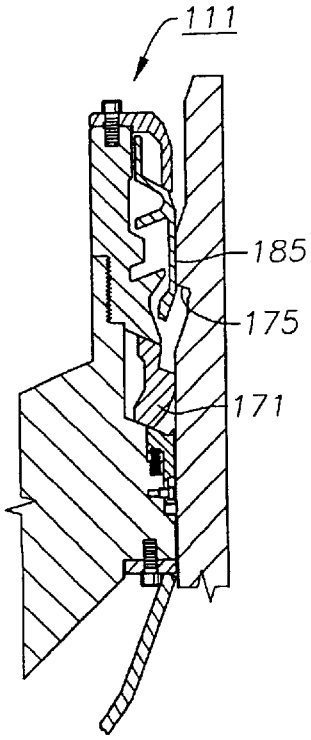
Fig. 13
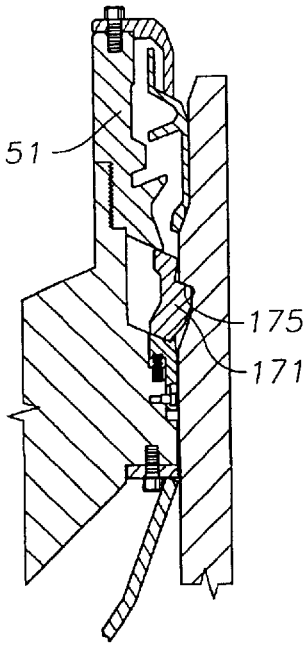
Fig. 14
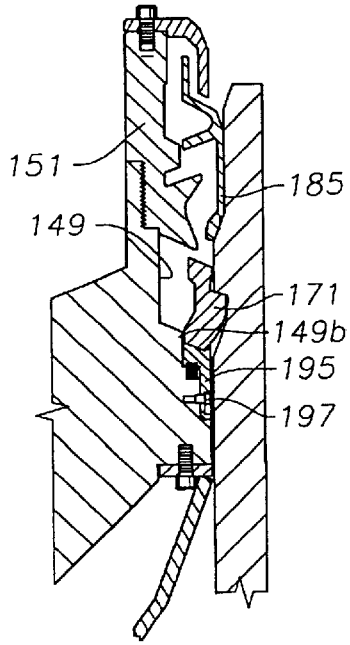
Fig. 15

VERTICAL STAB TENDON BOTTOM CONNECTOR AND METHOD FOR SECURING AND RELEASING THE SAME

Matter enclosed in heavy brackets [ ] appears in the original patent but forms no part of this reissue specification; matter printed in italics indicates the additions made by reissue.

This application claims benefit of provisional application 60/027,490, filed Sep. 27, 1996.

TECHNICAL FIELD

This invention relates in general to remotely operable connectors and in particular to an improved vertical entry bottom connector for the tendon of a tension leg platform.

BACKGROUND ART

The bottom connector of a tension leg platform (TLP) tendon connects the lower end of the tendon to an anchor template or pile on the sea floor in order to transfer tendon loads into the anchor structure.

There are two primary types of bottom connectors. Side entry bottom connectors are installed into a tendon bottom receptacle by inserting the connector through a slot in the side of the receptacle. Vertical entry bottom connectors are inserted downward through the top of the receptacle.

Typically, vertical entry bottom connectors are large and expensive to manufacture. Some prior art versions require rotation to engage and disengage the receptacle. Other versions require landing on a shoulder within the receptacle to release the connector. These latter devices have the additional, potential disadvantage of subjecting the tendons of the TLP to compressive forces.

DISCLOSURE OF INVENTION

In this invention, the receptacle on the sea floor has a bore with an inner profile and a recess located below the inner profile. A connector body is secured to the lower end of a tendon and lowered into the receptacle. An outwardly-biased latch is carried by the body and has an outer profile which engages the inner profile of the receptacle in an engaged position to limit upward movement of the body. The latch also has a retracted position wherein the latch is retracted out of engagement with the inner profile.

A retainer is mounted to the body and has a released position relative to the latch which allows the latch to move to the engaged position. The retainer has a locked position which holds the latch in the retracted position. Lowering the body until the retainer engages the recess causes the retainer to assume the locked position, thereby allowing the body to be withdrawn from the receptacle with the latch being held in the retracted position.

BRIEF DESCRIPTION OF DRAWINGS

FIGS. 11–21 are half-sectional views of the embodiment of FIG. 10A at various stages of engagement.

BEST MODE FOR CARRYING OUT THE INVENTION

Figure 1:
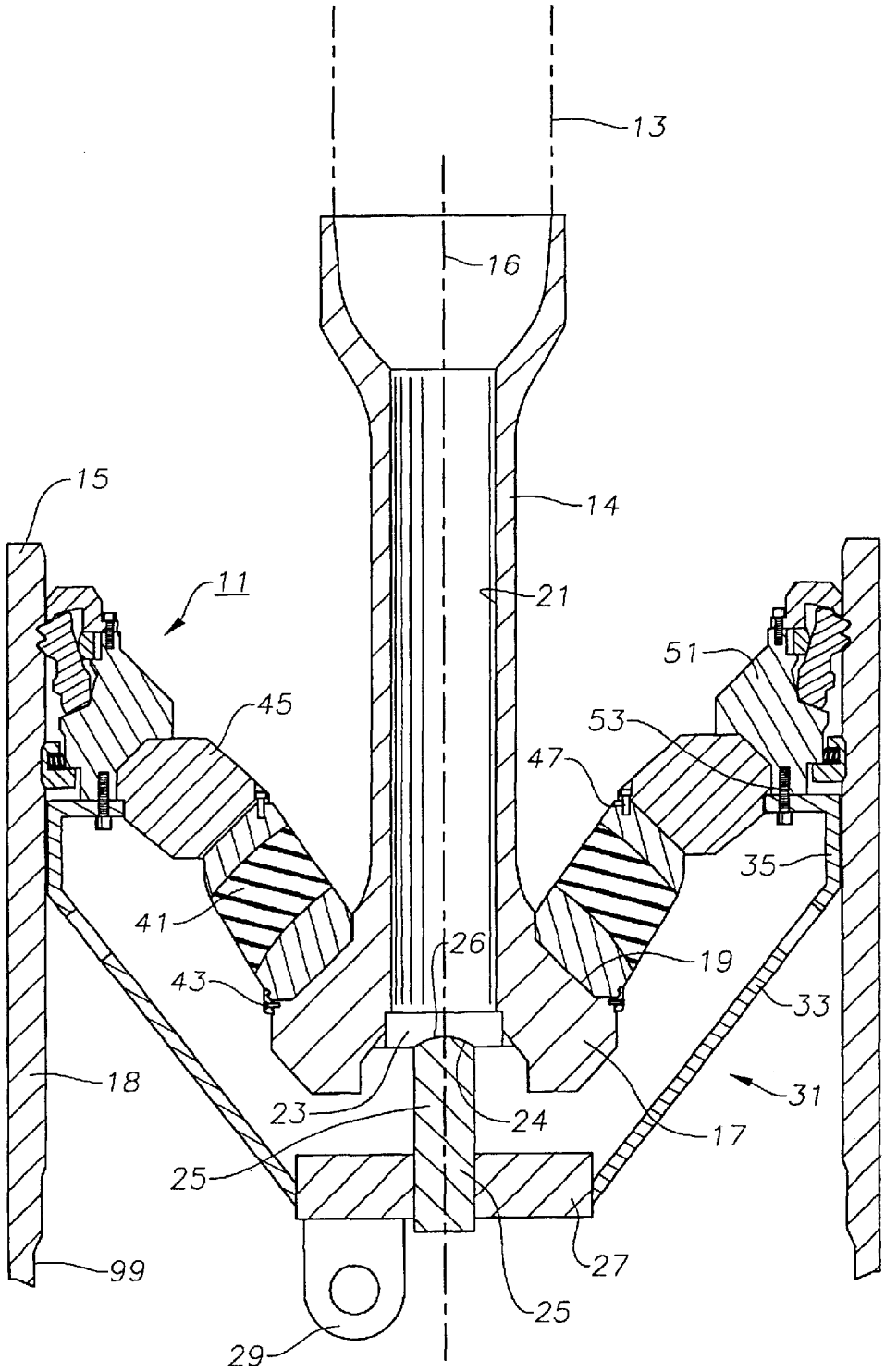
FIG. 1 is a sectional side view of a first embodiment of a bottom connector shown engaged to a receptacle for the tendon of a tension leg platform and is constructed in accordance with the invention.

Referring to FIG. 1, a bottom connector 11 for a tension leg platform tendon 13 is shown. Connector 11 has an inner tubular body 14 which is secured to a lower end of tendon 13. Connector 11 is provided for anchoring tendon 13 to a cylindrical receptacle 15 located on the sea floor (not shown). Once connector 11 is installed, tendon 13 and body 14 are in tension; no downward-directed force is applied to the assembly. Inner body 14 has a central axis 16 and a hub or flange 17 on a lower end with an upward-facing shoulder 19 on an outer side, and a coaxial bore 21.

Connector 11 has three substructures: a lower portion which is used to facilitate entry into a bore 18 in receptacle 15, an intermediate portion which accommodates for extraneous movement of tendon 13, and an upper portion which interfaces with bore 18 of receptacle 15.

Figure 9:
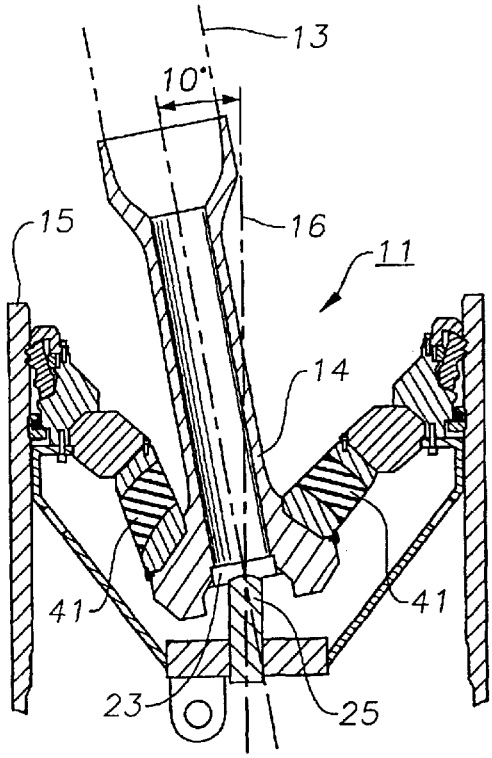
FIG. 9 is a sectional side view of the bottom connector, tendon and receptacle of FIG. 1 undergoing deflection.

The lower portion of connector 11 comprises an end plate 23 which is welded to the lower end of inner body 14 over bore 21 perpendicular to axis 16. End plate 23 has a coaxial, concave recess 24 on a lower side which receives a convex upper end 26 of a pivot member 25. Pivot member 25 extends upward into engagement with end plate 23 from a bottom plate or brace 27. End plate 23 is pivotal relative to pivot member 25 as shown in FIG. 9. A tow eye 29 extends downward from a lower side of bottom plate 27. The lower end of connector 11 also comprises a rigid guide funnel 31. Guide funnel 31 has a lower frustoconical portion 33 and an upper cylindrical portion 35. A lower end of frustoconical portion 33 is welded to bottom plate 27. Cylindrical portion 35 is concentric with axis 16 and has an outer diameter that is slightly less than the inner diameter of receptacle 15. The upper end of cylindrical portion 35 is welded to an annular retainer plate 37 which is perpendicular to axis 16.

The intermediate portion of connector 11 comprises a flexible element 41 which is landed on shoulder 19 of flange 17. Flexible element 41 extends upward from shoulder 19 and is fastened to tendon 13 with an annular clip 43. A spacer ring 45 is fastened to an upper end of flexible element 41 with bolts 47.

Figure 2:
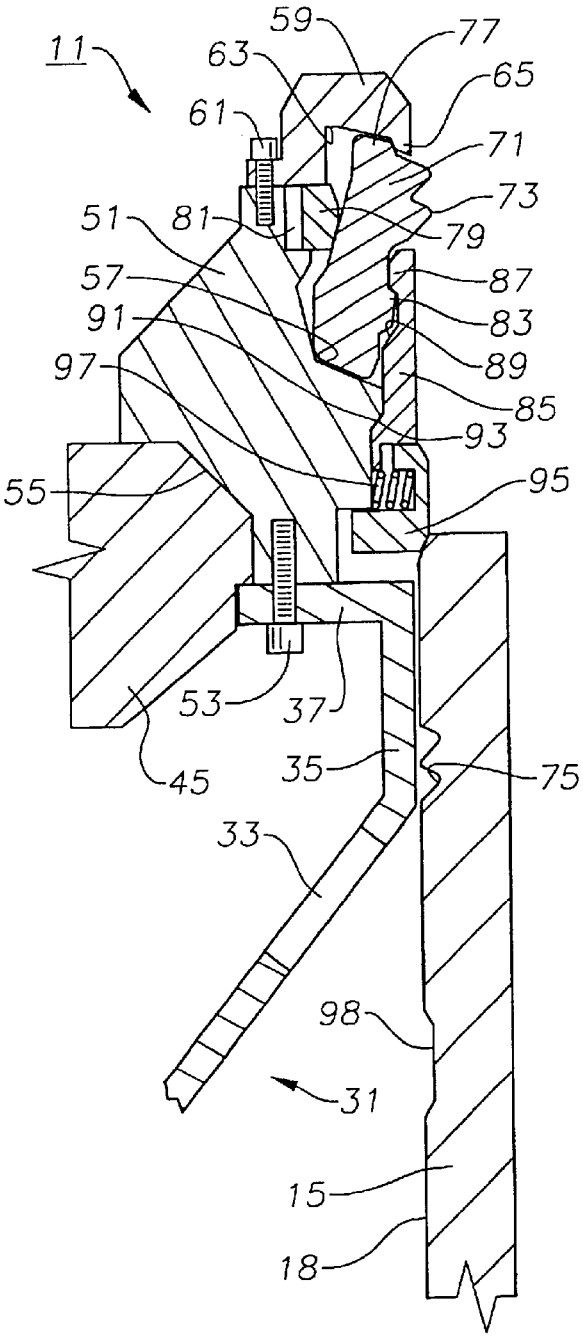
FIGS. 2–8 are half-sectional views of the bottom connector and receptacle of FIG. 1 at various stages of engagement.

Referring to FIG. 2, the upper portion of connector 11 has an outer body 51 which is fastened to spacer ring 45 and retainer plate 37 with bolts 53. The lower inside and the upper outside portion of body 51 are generally concave recesses 55, 57, with the lower inside portion 55 receiving spacer ring 45. A retainer cap 59 is fastened to the upper end of body 51 with bolts 61. Cap 59 has a generally V-shaped groove 63 and a lip 65 along an outer edge.

A latch 71 is located within recess 57 and groove 63. In the embodiment shown in FIG. 2, latch 71 comprises a plurality of segmented latches. Each segment of latch 71 is outwardly pivotal about a pivot point on a lower end. Latch 71 has a pair of external teeth or grooves 73 which are designed to mate with an inner profile 75 at the upper end of receptacle 15. Grooves 73 have outer flanks which are inclined upward. Latch 71 also has a small step or shoulder 77 on an upper end which engages lip 65 in cap 59. An outwardly-biased split ring spring 79 locates within a recess 81 between cap 59 and body 51. Spring 79 engages an inner side of latch 71. A rib 83 extends outward from latch 71 just below grooves 73.

Latch 71 is retained within bottom connector 11 by an annular blocking sleeve or retainer 85. Retainer 85 is a solid ring and is axially movable relative to body 51. Retainer 85 has an inner profile which generally mates with the outer surface of latch 71, including a lip 87 which lies between lower groove 73 and rib 83, and an internal groove 89 which engages rib 83. Retainer 85 also has an upward facing shoulder 91 which mates with a downward facing shoulder 93 on body 51 located just below recess 57. Retainer 85 is sliclably movable along body 51 from the upper released position shown in FIGS. 1–6, to the lower locked position shown in FIGS. 7–8. A lock member 95 is located below and is part of retainer 85 for restricting its movement relative to body 51 and latch 71. Lock member 95 is an outwardly-biased split ring. An entrapment pin 97 lies between lock member 95 and retainer 85 for maintaining the position of retainer 85. Pin 97 is spring-biased and releasable from a detent in a lower portion of retainer 85. Lock member 95 has an outer profile which is designed to mate with an intermediate groove 98 located below inner profile 75 in receptacle 15. In its expanded position of FIG. 1, lock member 95 has an outer diameter which is greater than the outer diameter of retainer 85. Referring back to FIG. 1, receptacle 15 also has a recess 99 on a lower end.

Figure 3:
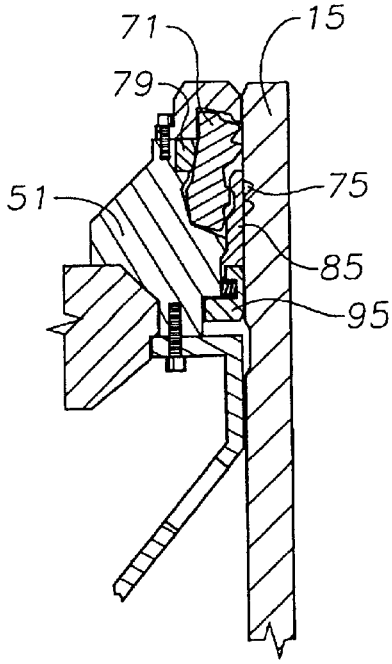

In operation, connector 11 is secured to tension leg platform tendon 13 and receptacle 15 is anchored to the sea floor. As shown in FIG. 2, the lower end of connector 11 is lowered into receptacle 15. If the axes of connector 11 and receptacle 15 are slightly misaligned, frustoconical portion 33 will assist in their proper alignment. Once the axes are aligned, cylindrical portion 35 drops into receptacle 15. As the upper portion of connector 11 enters receptacle 15, lock member 95 is collapsed radially inward, with its outer diameter flush with the inner diameter of receptacle 15 (FIG. 3). Latch 71 is pivoted radially inward, thereby collapsing spring 79 inward. Latch 71 is now in a retracted position.

Figure 4:
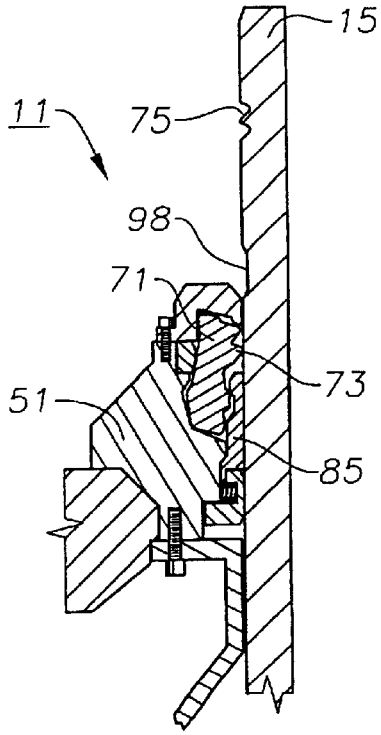
Figure 5:
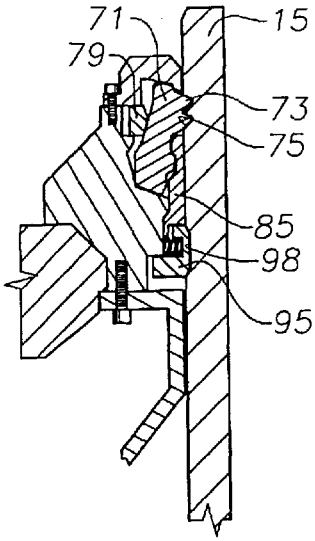

During its descent, the upward inclined flanks of grooves 73 prevent latch 71 from engaging inner profile 75. Retainer 85 slides over inner profile 75 and does not engage it since retainer 85 has an axial dimension which is longer than the axial dimension of inner profile 75. As shown in FIG. 4, connector 11 continues its descent into receptacle 15, generally unimpeded. Once grooves 73 are below inner profile 75, connector 11 is raised upward until latch 71 springs outward under the influence of spring 79 and grooves 73 engage inner profile 75 (FIG. 5). Once this step occurs, latch 71 is in an engaged position and prevents the upward movement of body 51. Lock member 95 snaps into intermediate recess 98, releasably preventing downward movement of connector 11 in receptacle 15. In this figure, retainer 85 is in a released position relative to latch 71 which allows latch 71 to move to the engaged position.

Referring to FIG. 9, once connector 11 is anchored into receptacle 15, it is capable of accommodating a significant amount of pivotal movement by tendon 13. By pivoting between end plate 23 and spacer plug 25, and flexing about flexible elements 41, connector 11 allows tendon 13 to pivot up to ten degrees relative to axis 16.

Figure 6:
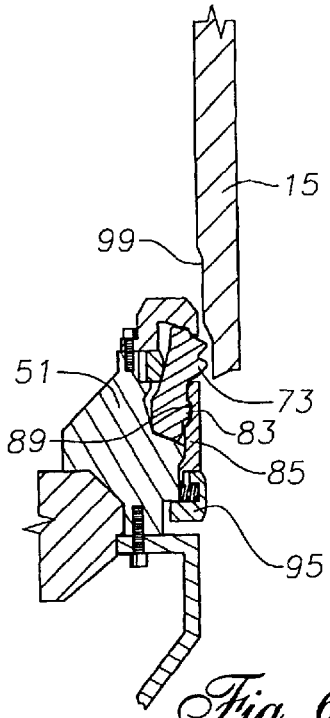
Figure 7:
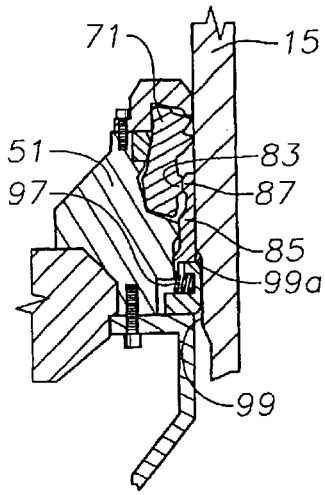
Figure 8:
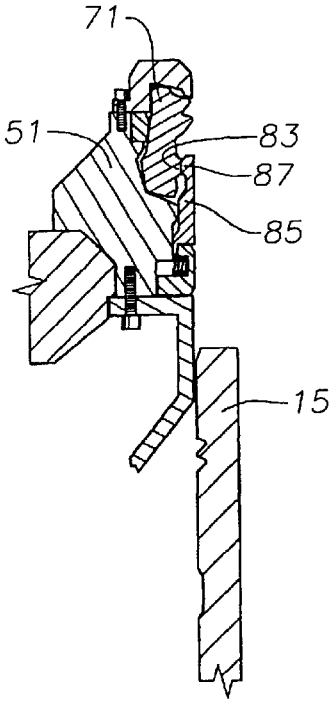

To disengage connector 11, it is once again lowered (FIG. 6). As described above, the inclined flanks of grooves 73 do not impede the downward motion of connector 11. The resistance to downward movement by retainer 85 and lock member 95 is overcome with a selected weight applied in a downward direction. The downward motion of connector 11 is stopped when retainer 85 is located in or below recess 99 of receptacle 15 (FIG. 6). Connector 11 is then lifted upward. When lock member 95 engages recess 99 (FIG. 7) it engages a downward-facing shoulder 99a, which causes pin 97 to release from the detent on retainer 85. Continued upward movement causes body 51 to move upward relative to retainer 85 and lock member 95. With this motion, lip 87 of retainer 85 is moved onto a radially outer surface of rib 83, thereby shifting retainer 85 from the released position to a locked position which holds latch 71 in the retracted position. Latch 71 is axially movable relative to retainer 85 while retainer 85 engages recess 99. Rib 83 engages internal groove 89 when retainer 85 is in the released position (FIGS. 5–6), and disengages from groove 89 when retainer 85 is in the locked position (FIGS. 7–8). As shown in FIG. 8, continued upward movement of body 51 moves latches 71 past inner profile 75, thereby allowing connector 11 and tendon 13 to be withdrawn from receptacle 15 with latch 71 being held in the retracted position.

Figure 10A:
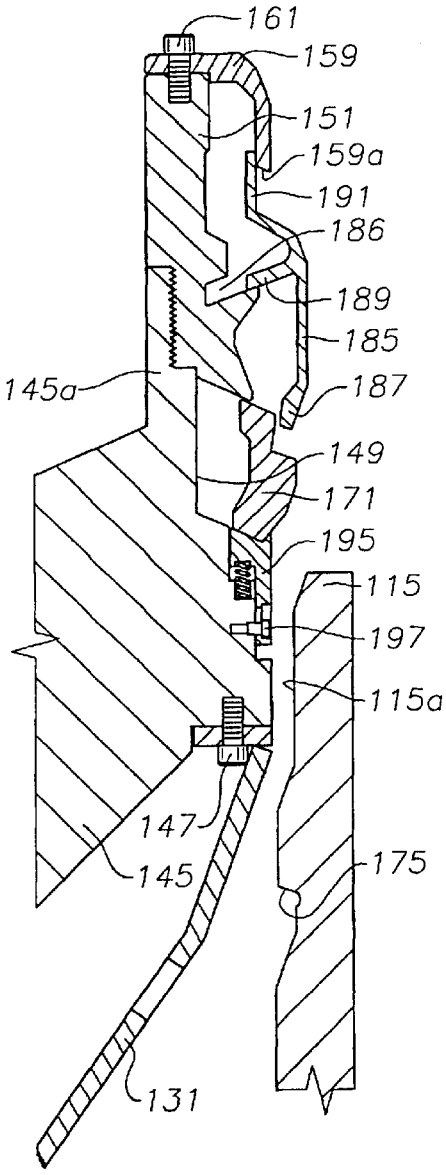
FIG. 10A is a half-sectional views of a second embodiment of the bottom connector and receptacle of FIG. 1 prior to engagement.
Figure 10B:
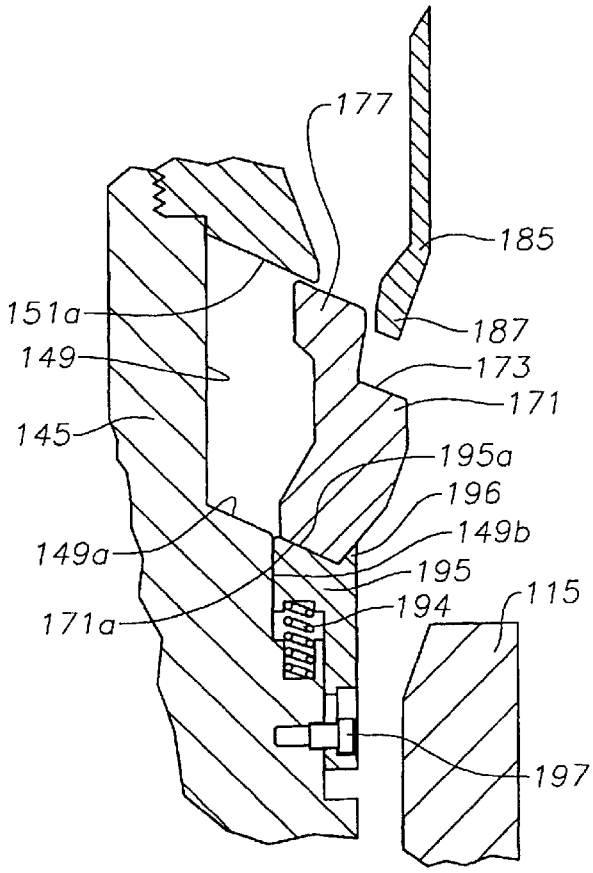
FIG. 10B is an enlarged portion of the half-sectional view of FIG. 10A.

A second embodiment of the invention is shown in FIGS. 10A and 10B. A bottom connector 111 for a tension leg platform tendon (not shown) is provided for anchoring the tendon to a cylindrical receptacle 115 located on the sea floor (not shown). The tendon is substantially similar to tendon 13 of FIG. 1. Like connector 11, connector 111 has lower, intermediate and upper portions.

The lower and intermediate portions of connector 111 are very similar to those of connector 11. A rigid guide funnel 131 has an outer diameter which is slightly less than the inner diameter of receptacle 115. The upper end of funnel 131 is fastened to an annular outer body 145 with bolts 147. Connector 111 also has an inner body (not shown) which attaches to a tendon and preferably mounts to outer body 145 with flex elements.

The upper outside portion of outer body 145 is a generally concave recess 149 with a downward sloping lower surface. An uppermost portion 145a of outer body 145 extends vertically and is threaded on an outer surface. A generally L-shaped housing 151 is threadingly fastened along its lower, inner surface to uppermost portion 145a. A retainer cap 159 is fastened to the upper end of housing 151 with bolts 161. Cap 159 has a generally downward facing U-shape with a lower outer edge 159a.

A latch 171 is located in recess 149 below an inclined, lower side 151a of housing 151. Side 151a is generally parallel to the lower surface of recess 149. In the embodiment shown in FIG. 10B, latch 171 comprises a split ring which is biased in a radially outward direction. Latch 171 is radially movable within recess 149 between an outer position shown in FIG. 10B and a contracted position shown in FIG. 18. Latch 171 has an upward-facing shoulder 173 which is designed to mate with an inner profile 175 at the upper end of receptacle 115. Latch 171 also has neck 177 on an upper end which engages side 151a.

Latch 171 may be retained within recess 149 in a retracted position by a split ring retainer 185. Retainer 185 is axially and radially movable relative to housing 151 and latch 171. Retainer 185 has an outer profile which generally mates with an upper profile 115a located above inner profile 175 in receptacle 115. Retainer 185 also has a lip 187 which extends downward toward latch 171, and an internal rib 189 which extends diagonally downward and inward and engages a slot 186 in housing 151. Retainer 185 also has an upper vertical portion 191 which engages edge 159a on cap 159.

Figure 17:
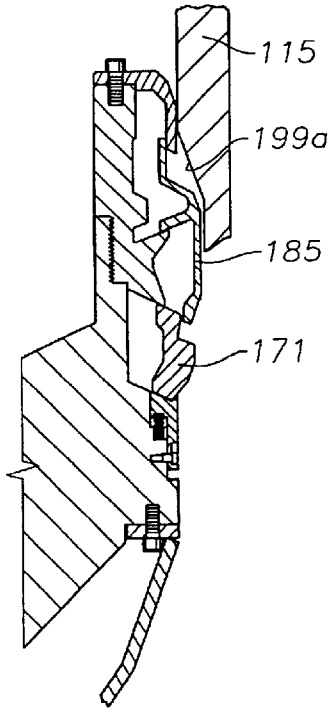
Figure 18:
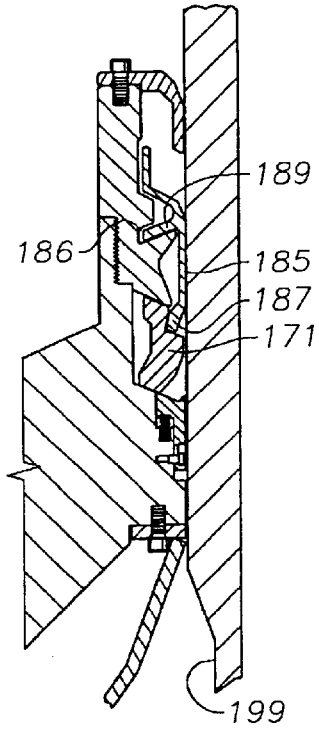

A release spring or lock member 195 is located along an outer edge of outer body 145 below latch 171 for accommodating its movement relative to outer body 145, housing 151 and retainer 185. A spring 194 extends between a lower portion of lock member 195 and outer body 145 for biasing lock member 195 in an upward direction. A positioner pin 197 extends between lock member 195 and outer body 145 for maintaining the position of lock member 195. The head of pin 197 locates in an elongated slot in lock member 195 to allow limited axial movement of lock member 195 relative to outer body 145. Lock member 195 has an upper surface 195a which is designed to engage the lower surface 171a of latch 171 and is flush with the lower surface 149a of recess 149 while in the upper position of FIGS. 10–14. Surface 195a and surface 171a have the same radial thickness and are inclined at the same angle as surface 149a. Lock member 195 has an upper, outer lip 196 for limiting the outward movement of latch 171. Like receptacle 15, receptacle 115 also has a recess 199 on a lower end (FIGS. 16–18).

Connector 111 operates very similarly to connector 11. As shown in FIG. 11, connector 111 is lowered into receptacle 115. As the upper portion of connector 111 enters receptacle 115, latch 171 and retainer 185 are collapsed radially inward until they have an outer diameter that is flush with the inner diameter of receptacle 115 (FIG. 12). Latch 171 is shown in a retracted position.

During its descent, the outer profile of latch 171 prevents it from locking into inner profile 175. Retainer 185 slides over inner profile 175 (FIG. 13) and does not engage it since retainer 185 has an axial dimension which is longer than the axial dimension of inner profile 175. Retainer 185 is compressed axially upward and radially inward during the descent. As shown in FIG. 13, connector 111 continues its descent into receptacle 115, generally unimpeded. Once latch 171 is below inner profile 175, the tendon and connector 111 are raised upward until latch 171 springs outward and engages inner profile 175 (FIG. 14). Once this step occurs, latch 171 is in an engaged position and prevents the upward movement of housing 151. Referring to FIG. 15, additional upward pull is then applied to the tendon which moves body 145 upward slightly relative to lock member 195. An outer edge 149b of recess 149 abuts an inner lower edge of latch 171 to prevent it from moving inward. Housing 151 moves upward slightly relative to lock member 195, compressing spring 194. Lock member 195 releasably prevents radially inward movement of latch 171 and, thus, downward movement of connector 111. In this figure, retainer 185 is in a released position relative to latch 171 which allows latch 171 to move to the engaged position.

Figure 16:
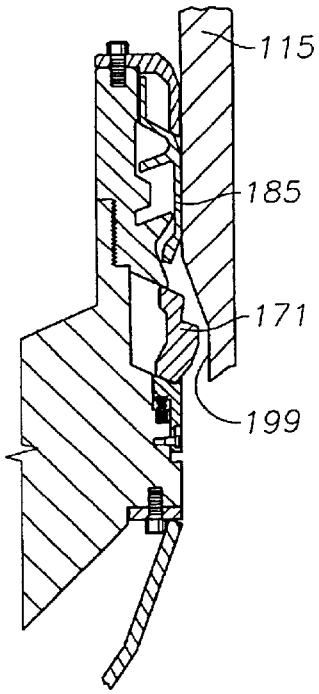
Figure 19:
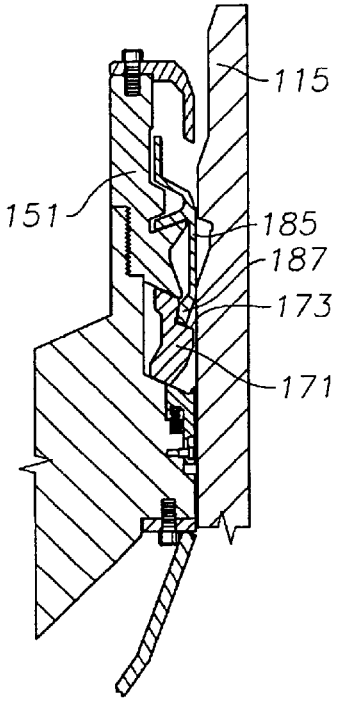
Figure 20:
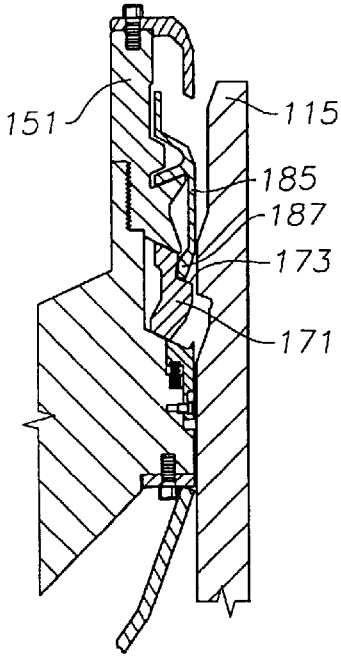
Figure 21:
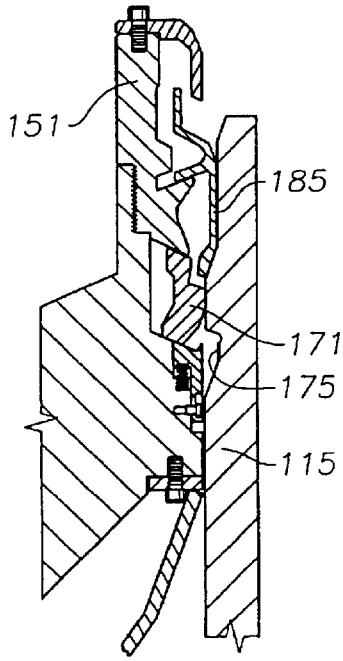

To disengage connector 111, it is once again lowered (FIG. 16). Latch 171 and retainer 185 do not impede the downward motion of connector 111. The resistance to downward movement by these components is overcome with a selected downward weight on the tendon. After being compressed upward and radially inward during the descent, retainer 185 springs downward and outward into recess 199 at the bottom of receptacle 115. The diagonal portion of retainer 185 located below vertical portion 191 slides along edge 159a to assist in this propagation. The downward motion of connector 111 is stopped when retainer 185 is located in or below recess 199 of receptacle 115 (FIG. 17). Latch 171 is axially and radially slidable relative to retainer 185 while retainer 185 engages recess 199. Connector 111 is then lifted upward. When retainer 185 engages recess 199 (FIG. 17), it springs outward relative to housing 151 and latch 171. Recess 199 has a downward-facing shoulder 199a which contacts retainer 185 as housing 151 is lifted. With this motion, lip 187 of retainer 185 is moved onto a radially outer surface of shoulder 173 on latch 171, thereby shifting retainer 185 from the released position to a locked position which holds latch 171 in the retracted position (FIG. 18). Rib 189 is simultaneously placed within slot 186 to prevent further axial movement of retainer 185. Lip 187 does not engage shoulder 173 when retainer 185 is in the released position (FIGS. 10–17), and engages shoulder 173 when retainer 185 is in the locked position (FIGS. 18–20). Lowering housing 151 until retainer 185 engages recess 199 causes retainer 185 to assume the locked position, thereby allowing connector 111 and the tendon to be withdrawn from receptacle 115 with latch 171 being held in the retracted position (FIGS. 19–21). Like connector 11, connector 111 is similarly capable of accommodating up to ten degrees of deflection by the tendon relative to its vertical axis.

The invention has several advantages. This vertical entry bottom connector does not require rotation or bottoming-out on a shoulder within the receptacle to disengage it. The invention employs a compact design, has very few moving parts and has a pivotal lower end which allows limited deflection of the connector inner body relative to the receptacle.

While the invention has been shown or described in only two of its forms, it should be apparent to those skilled in the art that it is not so limited, but is susceptible to various changes without departing from the scope of the invention.

We claim:

1. A bottom connector for a tension leg platform tendon, comprising:

a receptacle adapted to be mounted on the sea floor, the receptacle having a bore with an inner profile and a recess located below the inner profile;

a body adapted to be secured to the lower end of the tendon and lowered into the receptacle;

an outwardly-biased latch carried by the body and having an outer profile which engages the inner profile of the receptacle in an engaged position to limit upward movement of the body, and a retracted position wherein the latch is retracted out of engagement with the inner profile;

a retainer slidably mounted to the body and having a released position relative to the latch which allows the latch to move to the engaged position, and a locked position which holds the latch in the retracted position; and wherein lowering the body until the retainer engages the recess and then lifting the body causes the retainer to assume the locked position, thereby allowing the body to be withdrawn from the receptacle with the latch being held in the retracted position.

2. The bottom connector of claim 1 wherein the body is axially movable relative to the retainer, the retainer having an upper portion which engages the latch while the retainer is in the locked position.

3. The bottom connector of claim 2, further comprising an internal groove in the retainer; and wherein the latch has a rib which engages the internal groove in the retainer when the retainer is in the released position, and is disengaged from the groove in the retainer when the retainer is in the locked position.

4. The bottom connector of claim 1 wherein the latch is a split ring.

5. A bottom connector for a tension leg platform tendon, comprising:

a receptacle adapted to be mounted on the sea floor, the receptacle having a bore with an inner profile and a recess located below the inner profile;

a body adapted to be secured to the lower end of the tendon and lowered into the receptacle;

an outwardly-biased latch carried by the body and having an outer profile which engages the inner profile of the receptacle in an engaged position to limit upward movement of the body, and a retracted position wherein the latch is retracted out of engagement with the inner profile;

a retainer mounted to the body and having a released position relative to the latch which allows the latch to move to the engaged position, and a locked position which holds the latch in the retracted position; and wherein lowering the body until the retainer engages the recess and then lifting the body causes the retainer to assume the locked position, thereby allowing the body to be withdrawn from the receptacle with the latch being held in the retracted position; and wherein the latch is axially movable relative to the retainer while the retainer engages the recess, causing the retainer to assume the locked position.

6. The bottom connector of claim 5 wherein the latch and the body move upward relative to the retainer while the retainer engages the recess to move from the released position to the locked position.

7. The bottom connector of claim 5 wherein the retainer has a portion located radially outward of and engaging an outer surface of the latch while the retainer is in the locked position.

8. The bottom connector of claim 5, further comprising a spring mounted to the body for biasing the latch outward; and wherein the latch comprises a plurality of segments, each of which is outwardly pivotal about a pivot point on a lower end.

9. The bottom connector of claim 5, further comprising a split ring mounted to the body for biasing the latch outward; and wherein the latch comprises a plurality of segments, each of which is outwardly pivotal about a pivot point on a lower end.

10. A bottom connector for a tension leg platform tendon, comprising:

a receptacle adapted to be mounted on the sea floor, the receptacle having a bore with an inner profile and a recess located below the inner profile;

a body adapted to be secured to the lower end of the tendon and lowered into the receptacle;

an outwardly-biased latch carried by the body and having an outer profile which engages the inner profile of the receptacle in an engaged position to limit upward movement of the body, and a retracted position wherein the latch is retracted out of engagement with the inner profile;

a retainer mounted to the body and having a released position relative to the latch which allows the latch to move to the engaged position, and a locked position which holds the latch in the retracted position; and wherein lowering the body until the retainer engages the recess and then lifting the body causes the retainer to assume the locked position, thereby allowing the body to be withdrawn from the receptacle with the latch being held in the retracted position; and wherein the body comprises:

an inner body portion which is adapted to be secured to the lower end of the tendon;

an annular outer body portion surrounding the inner body portion; and a flexible element located between the inner body portion and the outer body portion for accommodating a limited amount of pivotal movement between the inner and the outer bodies.

11. A bottom connector for a tension leg platform tendon, comprising:

a receptacle adapted to be mounted on the sea floor, the receptacle having a bore with an inner profile and a recess located below the inner profile;

a body adapted to be secured to the lower end of the tendon and lowered into the receptacle;

an outwardly-biased latch carried by the body and having an outer profile which engages the inner profile of the receptacle in an engaged position to limit upward movement of the body, and a retracted position wherein the latch is retracted out of engagement with the inner profile;

a retainer mounted to the body and having a released position relative to the latch which allows the latch to move to the engaged position, and a locked position which holds the latch in the retracted position; and wherein lowering the body until the retainer engages the recess and then lifting the body causes the retainer to assume the locked position, thereby allowing the body to be withdrawn from the receptacle with the latch being held in the retracted position; and wherein the retainer is mounted to the body for limited axial movement relative to the body; and wherein the recess has a downward-facing shoulder which contacts the retainer as the body is lifted, moving the body upward relative to the retainer.

12. A bottom connector for a tension leg platform tendon, comprising:

a receptacle adapted to be mounted on the sea floor, the receptacle having a bore with an inner profile and a recess located below the inner profile;

a body adapted to be secured to the lower end of the tendon and lowered into the receptacle;

an outwardly-biased latch carried by the body and having an outer profile which engages the inner profile of the receptacle in an engaged position to limit upward movement of the body, and a retracted position wherein the latch is retracted out of engagement with the inner profile;

a retainer mounted to the body and having a released position relative to the latch which allows the latch to move to the engaged position, and a locked position which holds the latch in the retracted position; and wherein lowering the body until the retainer engages the recess and then lifting the body causes the retainer to assume the locked position, thereby allowing the body to be withdrawn from the receptacle with the latch being held in the retracted position;

an intermediate groove in the receptacle between the inner profile and the recess; and a lock member on a lower part of the retainer, the lock member engaging the intermediate groove in the receptacle when the latch engages the inner profile to releasably prevent downward movement of the body in the receptacle.

13. A bottom connector for a tension leg platform tendon, comprising:

a receptacle adapted to be mounted on the sea floor, the receptacle having a bore with an inner profile and a recess located below the inner profile;

a body adapted to be secured to the lower end of the tendon and lowered into the receptacle;

an outwardly-biased latch carried by the body and having an outer profile which engages the inner profile of the receptacle in an engaged position to limit upward movement of the body, and a retracted position wherein the latch is retracted out of engagement with the inner profile;

a retainer mounted to the body and having a released position relative to the latch which allows the latch to move to the engaged position, and a locked position which holds the latch in the retracted position; and wherein lowering the body until the retainer engages the recess and then lifting the body causes the retainer to assume the locked position, thereby allowing the body to be withdrawn from the receptacle with the latch being held in the retracted position; and wherein the body has a downward-inclined shoulder and the latch is slidably movable along the inclined shoulder.

14. The bottom connector of claim 13, further comprising a lock member mounted to the body for limited axial movement relative to the body, the lock member having an upper side that is flush with the inclined shoulder while in an upper position, the upper side of the lock member being in engagement with a lower side of the latch, wherein an upward poll on the tendon while the latch is in engagement with the inner profile causes the body to move slightly upward relative to the lock member and the latch to hold the latch outward in the engaged position.

15. A bottom connector for a tension leg platform tendon, comprising:

a receptacle adapted to be mounted on the sea floor, the receptacle having a bore with an inner profile and a recess located below the inner profile;

a body adapted to be secured to the lower end of the tendon and lowered into the receptacle;

an outwardly-biased latch carried by the body and having an outer profile which engages the inner profile of the receptacle in an engaged position to limit upward movement of the body, and a retracted position wherein the latch is retracted out of engagement with the inner profile;

a retainer mounted to the body and having a released position relative to the latch which allows the latch to move to the engaged position, and a locked position which holds the latch in the retracted position; and wherein lowering the body until the retainer engages the recess and then lifting the body causes the retainer to assume the locked position, thereby allowing the body to be withdrawn from the receptacle with the latch being held in the retracted position; and wherein the retainer is a split ring located above the latch, the split ring having a lower portion which extends downward over the latch when in the locked position.

16. The bottom connector of claim 15 wherein the retainer is a split ring located above the latch, the split ring having a lower portion which extends downward over the latch when in the locked position, and a rib which extends into a slot in the body for holding the split ring in the locked position, the rib being spaced above the slot and the lower portion being spaced above the latch in the released position.

17. A bottom connector for a tension leg platform tendon, comprising:

a receptacle adapted to be mounted on the sea floor, the receptacle having a bore with an inner profile and a recess located below the inner profile;

a body adapted to be secured to the lower end of the tendon and lowered into the receptacle;

an outwardly-biased latch carried by the body and having an outer profile which engages the inner profile of the receptacle in an engaged position to limit upward movement of the body, and a retracted position wherein the latch is retracted out of engagement with the inner profile;

a retainer sleeve mounted to the body which is axially movable relative to the sleeve, the sleeve having a released position relative to the latch which allows the latch to move to the engaged position, and a locked position which holds the latch in the retracted position, the latch moving upward relative to the sleeve as the sleeve moves from the released position to the locked position; and wherein lowering the body until the sleeve engages the recess and then lifting the body causes the sleeve to assume the locked position.

18. The bottom connector of claim 17 wherein the sleeve has a portion located outward of and engaging an outer surface of the latch while the sleeve is in the locked position.

19. The bottom connector of claim 17, further comprising a spring for biasing the latch outward; and wherein the latch comprises a plurality of segments, each of which is outwardly pivotal about a pivot point on a lower end.

20. The bottom connector of claim 17, further comprising an internal groove in the sleeve; and wherein the latch has a rib which engages the internal groove in the sleeve when the sleeve is in the released position, and is disengaged from the groove in the sleeve when the sleeve is in the locked position.

21. The bottom connector of claim 17 wherein the sleeve has a lock member portion mounted to the body for limited axial movement relative to the body; and wherein the recess has a downward-facing shoulder which is contacted by the lock member portion of the sleeve to cause the body to move upward relative to the sleeve while the body is lifted.

22. The bottom connector of claim 17, further comprising:

an intermediate groove in the receptacle between the inner profile and the recess; and a lock member on a lower part of the sleeve, the lock member engaging the intermediate groove in the receptacle when the latch engages the inner profile to releasably prevent downward movement of the body in the receptacle.

23. The bottom connector of claim 17 wherein the body has a downward-inclined shoulder and the latch is a split ring which is slidably movable along the inclined shoulder.

24. The bottom connector of claim 17, further comprising a split ring lock member mounted to the body in engagement with the sleeve for releasably holding the sleeve to the body for axial movement therewith, the lock member being engagable with the recess, the body being movable axially relative to the lock member, wherein an upward pull on the tendon while the lock member is engaging the recess causes the latch and the body move upward relative to the sleeve to cause the sleeve to hold the latch in the retracted position.

25. The bottom connector of claim 17 wherein the sleeve comprises a split ring located above the latch, the split ring having a lower portion which extends downward over the latch when in the locked position, and a rib which extends into a slot in the body for holding the split ring in the locked position, the rib being spaced above the slot and the lower portion being spaced above the latch in the releasably position.

26. A bottom connector for a tension leg platform tendon, comprising:

a receptacle adapted to be mounted on the sea floor, the receptacle having a bore with an inner profile and a recess located below the inner profile;

a body adapted to be secured to the lower end of the tendon and lowered with the tendon into the receptacle;

a plurality of latch segments, each of which is outwardly pivotal about a pivot point on a lower end, the latch segments being carried by the body and having an outer profile which engages the inner profile of the receptacle in an outward engaged position to limit upward movement of the body, and an inward retracted position wherein the latch segments are retracted out of engagement with the inner profile;

a split ring mounted to the body for biasing the latch segments in an outward direction;

an axially movable retainer sleeve mounted to the body and having a released position relative to the latch segments which allows the latch segments to move outward to the engaged position, and a locked position wherein an upper portion holds the latch segments in the retracted position; and wherein lowering the body until the sleeve engages the recess and then lifting upward causes the latch segments to move upward relative to the sleeve, placing the sleeve in the locked position.

27. The bottom connector of claim 26, further comprising:

an internal groove in the sleeve; and wherein each of the latch segments has a rib which engages the internal groove in the sleeve when the sleeve is in the released position, and is disengaged from the internal groove in the sleeve when the sleeve is in the locked position.

28. The bottom connector of claim 26 wherein the sleeve has a lock member portion mounted to the body for limited axial movement relative to the body; and wherein the recess has a downward-facing shoulder which contacts the lock member portion of the sleeve as the body is lifted for moving the body upward relative to the lock member and the sleeve.

29. The bottom connector of claim 26, further comprising an intermediate groove in the receptacle between the inner profile and the recess; and a split ring lock member on a lower part of the sleeve, the lock member engaging the intermediate groove in the receptacle when the latch segments engage the inner profile to releasably prevent downward movement of the body in the receptacle.

30. A bottom connector for a tension leg platform tendon, comprising:

a receptacle adapted to be mounted on the sea floor, the receptacle having a bore with an inner profile and a recess located below the inner profile;

a body adapted to be secured to the lower end of the tendon and having a slot and a downward-inclined shoulder;

an outwardly-biased, split ring latch carried by the body on the shoulder and having an outer profile which engages the inner profile of the receptacle in an engaged position to limit upward movement of the body, and a retracted position wherein the latch is retracted out of engagement with the inner profile;

a split ring retainer mounted to the body above the latch for axial movement relative to the body and the latch, the retainer having a released position relative to the latch which allows the latch to move to the engaged position, and a locked position wherein a lower portion of the split ring extends downward over the latch to hold the latch in the retracted position;

a rib on an inner portion of the retainer which extends into the slot in the body for holding the split ring in the locked position, the rib being in disengagement with the slot and above the slot while the retainer is in the released position; and wherein lowering the body until the retainer engages the recess and then lifting the body upward causes the retainer to assume the locked position.

31. The bottom connector of claim 30, further comprising a lock member mounted to the body for limited axial movement relative to the body, the lock member having an upper side flush with the inclined shoulder while in an upper position, the upper side of the lock member being in engagement with a lower side of the latch, wherein an upward pull on the tendon while the latch is in engagement with the inner profile causes the body to move slightly upward relative to the lock member and the latch to hold the latch in the engaged position.

32. A method for securing and releasing a bottom connector on a tension leg platform tendon, comprising:

(a) providing a receptacle on the sea floor with a bore having an inner profile and a recess located below the inner profile;

(b) securing a body to a lower end of the tendon, the body having a retainer mounted thereto and an outwardly-biased latch with an outer profile for engaging the inner profile of the receptacle, the retainer being in a released position relative to the latch which allows the latch to move to an engaged position;

(c) lowering the body into the receptacle and engaging the latch with the inner profile of the receptacle to limit upward movement of the body; and then to disengage the bottom connector, (d) lowering the body until the retainer is located in the recess in the receptacle; and then (e) lifting the body out of the receptacle, causing the retainer to move to a locked position which holds the latch in a retracted position out of engagement with the inner profile.

33. The method of claim 32 wherein step (c) comprises lowering the latch below the inner profile, then raising the body and the latch until the latch engages the inner profile.

34. The method of claim 32 wherein step (e) comprises moving a portion of the retainer into engagement with an outer surface of the latch while the retainer is in the locked position.

35. A method for securing and releasing a bottom connector on a tension leg platform tendon, comprising:

(a) providing a receptacle on the sea floor with a bore having an inner profile and a recess located below the inner profile;

(b) securing a body to a lower end of the tendon, the body having a retainer and an outwardly-biased latch with an outer profile for engaging the inner profile of the receptacle, the retainer being in a released position relative to the latch which allows the latch to move to an engaged position;

(c) lowering the body into the receptacle and engaging the latch with the inner profile of the receptacle to limit upward movement of the body; and then to disengage the bottom connector.

(d) lowering the body until the retainer is located in the recess in the receptacle; and then (e) lifting the body out of the receptacle, causing the retainer to move to a locked position which holds the latch in a retracted position out of engagement with the inner profile; and wherein step (e) comprises moving the body and the latch upward relative to the retainer while the retainer is in the recess.

36. The method of claim 35, further comprising:

retaining the body against downward movement up to a selected downward force after step (c) and before step (d); and wherein step (d) comprises applying a downward force on the body which is greater than said selected downward force.

*37. A connector comprising:*

*a receptacle having a bore with an inner profile and a recess located below the inner profile;*

*a body adapted to be lowered into the receptacle;*

*an outwardly-biased latch carried by the body and having an outer profile which engages the inner profile of the receptacle in an engaged position to limit upward movement of the body, and a retracted position wherein the latch is retracted out of engagement with the inner profile;*

*a retainer slidably mounted to the body and having a released position relative to the latch which allows the latch to move to the engaged position, and a locked position which holds the latch in the retracted position; and*

*wherein lowering the body until the retainer engages the recess and then lifting the body causes the retainer to assume the locked position, thereby allowing the body to be withdrawn from the receptacle with the latch being held in the retracted position.*

*38. The connector of claim 37 wherein the body is axially movable relative to the retainer, the retainer having an upper portion which engages the latch while the retainer is in the locked position.*

*39. The connector of claim 37, further comprising an internal groove in the retainer; and wherein*

*the latch has a rib which engages the internal groove in the retainer when the retainer is in the released position, and is disengaged from the groove in the retainer when the retainer is in the locked position.*

*40. The connector of claim 37 wherein the latch is a split ring.*

*41. A connector comprising:*

*a receptacle having a bore with an inner profile and a recess located below the inner profile;*

*a body adapted to be lowered into the receptacle;*

*an outwardly-biased latch carried by the body and having an outer profile which engages the inner profile of the receptacle in an engaged position to limit upward movement of the body, and a retracted position wherein the latch is retracted out of engagement with the inner profile;*

*a retainer sleeve mounted to the body which is axially movable relative to the sleeve, the sleeve having a released position relative to the latch which allows the latch to move to the engaged position, and a locked position which holds the latch in the retracted position, the latch moving upward relative to the sleeve as the sleeve moves from the released position to the locked position; and*

*wherein lowering the body until the sleeve engages the recess and then lifting the body causes the sleeve to assume the locked position.*

*42. The connector of claim 41 wherein the sleeve has a portion located outward of and engaging an outer surface of the latch while the sleeve is in the locked position.*

*43. The connector of claim 41, further comprising a spring for biasing the latch outward; and wherein*

*the latch comprises a plurality of segments, each of which is outwardly pivotal about a pivot point on a lower end.*

*44. The connector of claim 41, further comprising:*

*an internal groove in the sleeve; and wherein*

*the latch has a rib which engages the internal groove in the sleeve when the sleeve is in the released position, and is disengaged from the groove in the sleeve when the sleeve is in the locked position.*

*45. The connector of claim 41, wherein the sleeve has a lock member portion mounted to the body for limited axial movement relative to the body; and wherein*

*the recess has a downward-facing shoulder which is contacted by the lock member portion of the sleeve to cause the body to move upward relative to the sleeve while the body is lifted.*

*46. The connector of claim 41, further comprising:*

*an intermediate groove in the receptacle between the inner profile and the recess; and*

*a lock member on a lower part of the sleeve, the lock member engaging the intermediate groove in the receptacle when the latch engages the inner profile to releasably prevent downward movement of the body in the receptacle.*

*47. The connector of claim 41 wherein the body has a downward-inclined shoulder and the latch is a split ring which is slidably movable along the inclined shoulder.*

*48. The connector of claim 41, further comprising a split ring lock member mounted to the body in engagement with the sleeve for releasably holding the sleeve to the body for axial movement therewith, the lock member being engagable with the recess, the body being movable axially relative to the lock member, wherein an upward pull on the body while the lock member is engaging the recess causes the latch and the body move upward relative to the sleeve to cause the sleeve to hold the latch in the retracted position.*

*49. The connector of claim 41 wherein the sleeve comprises a split ring located above the latch, the split ring having a lower portion which extends downward over the latch when in the locked position, and a rib which extends into a slot in the body for holding the split ring in the locked position, the rib being spaced above the slot and the lower portion being spaced above the latch in the released position.*

*50. A method for securing and releasing a connector comprising:*

*(a) providing a receptacle on the sea floor with a bore having an inner profile and a recess located below the inner profile;*

*(b) providing a body having a retainer mounted thereto and an outwardly-biased latch with an outer profile for engaging the inner profile of the receptacle, the retainer being in a released position relative to the latch which allows the latch to move to an engaged position;*

(*c*) *lowering the body into the receptacle and engaging the latch with the inner profile of the receptacle to limit upward movement of the body, and then to disengage the connector;*

(*d*) *lowering the body until the retainer is located in the recess in the receptacle; and then*

(*e*) *lifting the body out of the receptacle, causing the retainer to move to a locked position which holds the latch in a retracted position out of engagement with the inner profile.*

*51. The method of claim 50 wherein step* (*c*) *comprises lowering the latch below the inner profile, then raising the body and the latch until the latch engages the inner profile.*

*52. The method of claim 50 wherein step* (*e*) *comprises moving a portion of the retainer into engagement with an outer surface of the latch while the retainer is in the locked position.*

* * * * *